(12) United States Patent
Meier et al.

(10) Patent No.: US 8,560,644 B2
(45) Date of Patent: *Oct. 15, 2013

(54) METHOD AND APPARATUS FOR CONFIGURING A MOBILE NODE TO RETAIN A "HOME" IP SUBNET ADDRESS

(75) Inventors: Robert C. Meier, Cuyahoga Falls, OH (US); Alpesh S. Patel, Santa Clara, CA (US); Kent K. Leung, Mountain View, CA (US); Timothy Olson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

This patent is subject to a terminal disclaimer.

(21) Appl. No.: 11/944,187

(22) Filed: Nov. 21, 2007

(65) Prior Publication Data

US 2008/0071890 A1    Mar. 20, 2008

Related U.S. Application Data

(63) Continuation of application No. 10/264,851, filed on Oct. 2, 2002, now Pat. No. 7,356,009.

(51) Int. Cl.
*G06F 15/16* (2006.01)

(52) U.S. Cl.
USPC ........... 709/220; 709/222; 709/228; 709/245; 709/249

(58) Field of Classification Search
USPC .................. 709/220, 222, 228, 245, 249
See application file for complete search history.

(56) References Cited

U.S. PATENT DOCUMENTS

| | | | | |
|---|---|---|---|---|
| 6,070,187 A * | 5/2000 | Subramaniam et al. | ....... | 709/220 |
| 6,119,165 A * | 9/2000 | Li et al. | .......... | 709/229 |
| 6,438,594 B1 * | 8/2002 | Bowman-Amuah | .......... | 709/225 |
| 6,546,425 B1 * | 4/2003 | Hanson et al. | ................ | 709/227 |
| 6,697,851 B1 * | 2/2004 | Althaus et al. | ................ | 709/220 |
| 7,016,353 B2 * | 3/2006 | Proctor et al. | ................ | 370/392 |
| 7,356,009 B1 * | 4/2008 | Meier et al. | ................... | 370/338 |
| 2002/0098840 A1 * | 7/2002 | Hanson et al. | ................ | 455/435 |
| 2003/0224788 A1 * | 12/2003 | Leung et al. | ............... | 455/435.1 |
| 2004/0177133 A1 * | 9/2004 | Harrison et al. | .............. | 709/220 |
| 2004/0243722 A1 * | 12/2004 | Matsui | .......... | 709/249 |
| 2005/0074015 A1 * | 4/2005 | Chari et al. | .................. | 370/400 |
| 2005/0125511 A1 * | 6/2005 | Hunt | ............................ | 709/220 |
| 2005/0237962 A1 * | 10/2005 | Upp et al. | ..................... | 370/313 |
| 2005/0286518 A1 * | 12/2005 | Park et al. | ..................... | 370/389 |
| 2006/0206597 A1 * | 9/2006 | Kim et al. | ..................... | 709/220 |
| 2009/0019164 A1 * | 1/2009 | Brown et al. | ................. | 709/227 |
| 2010/0085920 A1 * | 4/2010 | Chari et al. | .................. | 370/328 |

OTHER PUBLICATIONS

R. Droms and W. Arbaugh; RFC 3118; Jun. 2001; Network Working Group; Authentication of DHCP Messages; 18 Pages.*

(Continued)

*Primary Examiner* — Larry Donaghue
*Assistant Examiner* — Anthony Fabbri
(74) *Attorney, Agent, or Firm* — Tucker Ellis LLP

(57) ABSTRACT

A method and implementation are disclosed for binding a mobile node to a subnet. The invention comprises steps and implementations for intercepting messages sent by a mobile node to a server, associating a predetermined subnet with the intercepted messages and forwarding the intercepted messages to the server. The invention intercepts reply messages sent by at least one server and selects reply messages that are associated with the predetermined subnet. The selected reply messages are forwarded to the mobile node, and reply messages that are not associated with the predetermined subnet are discarded.

16 Claims, 2 Drawing Sheets

(56) References Cited

OTHER PUBLICATIONS

Thomas Shinder; Back to basics: The DHCP Relay Agent; Jul. 1, 2010; ServerWatch; 3 pages.*

G. Waters; RFC 3011—The IPv4 Subnet Selection Option for DHCP; Nov. 2000; Network Working Group; 7 Pages.*

* cited by examiner

METHOD AND APPARATUS FOR CONFIGURING A MOBILE NODE TO RETAIN A "HOME" IP SUBNET ADDRESS

CROSS-REFERENCE TO RELATED APPLICATIONS

This application is a continuation of U.S. patent application Ser. No. 10/264,851 filed on Oct. 2, 2002 now U.S. Pat. No. 7,356,009.

TECHNICAL FIELD

This disclosure is directed to the field of mobile telecommunications, particular to mobile network telecommunications, e.g. Internet communications.

BACKGROUND OF THE INVENTION

The Internet Protocol ("IP" or "TCP/IP") has emerged as a common standard for most network communication. In previous-type network schemes, the network devices (e.g. client computers) were connected by wired connections. Each device required an IP address that identified the device's unique point of attachment to the Internet. In order to receive data packets (e.g. email messages, web pages, etc.), the client device was required to be located on the network associated with its IP address. Otherwise, the data packets would be undeliverable to the destination device. If a change was necessitated in a device's point of attachment, the device required a change in its IP address, in order to preserve its ability to communicate. Otherwise, elaborate host-specific routes had to be propagated throughout much of the Internet routing fabric resulting in considerable network administrative overhead. Furthermore, IP requires that addresses and configuration settings to be defined for each device in the network. This also results in a considerable amount of system administrative effort.

The Dynamic Host Configuration Protocol ("DHCP") was developed to relieve the volume of system administration required to manage an IP network. With DHCP, "pools" of IP addresses are assigned to a DHCP server. These address pools are called "scopes" in protocol terminology. The addresses are then allocated to client devices by the DHCP server. In addition to assigning IP addresses, DHCP also enables the setting of required configuration parameters such as subnet, mask, default router and DNS (Domain Name System) server, as are required for TCP/IP to function properly. DHCP works across most routers and allocates IP addresses for the local subnet in which the request initiated. In this way, HCP eliminates the need to manually reconfigure a new IP address for a device that moves from one subnet to another. In this way, DHCP allows mobile client devices to move "nomadically" across subnets; however, communication is disrupted each time a new IP address is assigned to a mobile device. Another aspect of DHCP is that IP addresses can be leased for periods of time. When the address expires, the device may request a renewal. Otherwise, the IP address is put back into the "scope" of unallocated addresses, so as to recover and efficiently manage unused, available IP addresses.

The procedure for using DHCP is as follows. Upon initial activation of a DHCP client, the client sends a broadcast DHCP request packet over the network. This packet is received by a DHCP server, which then allocates an available IP address to the device from one of its scopes. Each DHCP scope is used for a different TCP/IP network subnet. A mobile client device may transmit a broadcast DHCP request on a network subnet that does not have a local DHCP server. In that case, a "relay agent" must intercept the request and forward it to the DHCP server on a different subnet. The relay agent adds information that identifies the local subnet of the mobile client. This information enables the DHCP server to identify the network subnet from which the request originated. The DHCP server then uses this information to allocate an IP address from the correct scope. The DHCP server replies to the client by allocating a IP address along with the required settings.

Typically, DHCP does not permanently allocate addresses to clients. Rather, it "leases" an address to a client for a specific time period, governed by the system administrator. When the lease expires, the client can ask the server to renew the lease. If the DHCP server does not receive a renewal request by the expiration of the lease period, it will put the address back into the scope to be reused.

In recent times, wireless mobile devices have become popular. It is desired that these devices also use the IP protocol. Because mobile devices change locations, the device may be located on either a "home" or "foreign" network subnet. Presently, each mobile device is always identified by its home address, regardless of its current point of attachment to the Internet. A standard protocol, Mobile IP, is used to forward IP packets between a mobile host on a foreign network and the home network of the mobile host. When connected away from its home network, the mobile device receives packets through a "care-of" address, which provides the is home server with information about its current point of attachment to the Internet. A "Proxy Mobile IP" entity (e.g. in a parent access point) can provide proxy Mobile IP services for an IP client that does not support Mobile IP.

A mobile host that boots on its home subnet can use DHCP to obtain a home IP address specific to its home subnet. By default, a DHCP server will allocate an IP address for the subnet where the DHCP request originates. For this reason, a mobile host that boots on a foreign subnet cannot simply broadcast a DHCP request on the local subnet to obtain an IP address for its home subnet. The Mobile IP standard requires that a mobile host must have a permanent IP address for its home subnet. Therefore, a mobile host, without an IP address, cannot use mobile IP to forward a DHCP request to a DHCP server on its home subnet because it does not have a home IP address. Therefore, a mobile device cannot use DHCP when booting on a foreign network. Thus, there is a need for a mobile host, attached to a foreign subnet, to be able to access a DHCP server to obtain an IP address for its home address.

In a previous solution to the aforementioned DHCP problem, a mobile host can send a Mobile IP Registration Request with a "home address" of zero to a "Home agent" on its home subnet. The mobile host obtains a "temporary home IP address" from the home agent. The mobile host then sends an inbound request to the home DHCP server, and from there the home DHCP server services the request. This solution assumes that the corresponding DHCP reply will be sent to a broadcast Media Access Control (MAC) address (i.e. an Ethernet address). However, the DHCP standard recommends that the DHCP reply to be sent to a unicast MAC address. A Mobile IP home agent in a router can only receive data frames with the unicast destination 802 address from the router interface. Therefore, a DHCP reply with a different unicast 802 destination address cannot be forwarded to the mobile host by the home agent.

A proposed solution to the above problem has been to enter the temporary IP address assigned to the mobile host into the "giadrr" field of a DHCP request. However, this proposal is in conflict with current DHCP/BOOTP forwarding rules.

BOOTP rules require that when a BOOTP relay agent receives a request, if the "giadrr" field is zero, the BOOTP relay agent inserts its address and then forwards the request. However, if the "giadrr" field is non-zero, the BOOTP relay agent cannot forward the request. Therefore, this proposed solution will not work because the BOOTP relay agent cannot forward a BOOTP or DHCP request with a non-zero "giadrr" field, thereby limiting its practicality.

A common requirement for deploying a WLAN (wireless local area network) is to provide secure access to "guest" users using an isolated "guest" subnet. It is not practical to manually configure such guest devices with an IP address; therefore, guest devices must use DHCP to dynamically obtain an IP address. A guest subnet can be created by configuring a guest VLAN (virtual local area network) for each WLAN AP (access point). However, this solution has certain drawbacks. In this scheme, an AP cannot provide "VLAN access" to a guest subnet unless it is attached to an Ethernet switch or a VLAN trunk line. Also, VLANs tend to be localized (i.e. to a floor in a building). Therefore, the scope of a VLAN-based guest subnet may be severely limited since it is not efficient or scaleable to increase the size of a VLAN. "Proxy Mobile IP" cannot be used to bind a guest device to a secure guest subnet until the guest device obtains an IP address for that subnet. The guest device cannot use DHCP to obtain a "guest" IP address if it is attached to the network on a different subnet.

A TCP/IP application communications endpoint in a mobile (or non-mobile) client is identified by the client's IP address and a UDP or TCP protocol port. An application communications session is lost if the IP address changes. A mobile client must keep the same IP address to roam "seamlessly." If DHCP is enabled on a Windows 2000 mobile device, the TCP/IP stack in the mobile device will release its current IP address and obtain a new IP address (via DHCP) each time the mobile device roams into a new AP service area, whether the new AP is on the same subnet or a different subnet. Therefore, the Mobile IP proxy cannot be used to keep a Windows 2000 mobile device bound seamlessly to a non-local home subnet.

Overview of Example Embodiments

The difficulties and drawbacks associated with previous-type systems are overcome by the example embodiments described herein. A method and apparatus are disclosed for binding a mobile node to a subnet. The method comprises steps for intercepting messages sent by a mobile node on a foreign subnet to a server, associating a predetermined home subnet with the intercepted messages, inserting a subnet selection information into the messages, and then relaying the messages onto the local foreign subnet. The method intercepts reply messages sent by at least one server, selects reply messages that are associated with the predetermined home subnet. The selected reply messages are forwarded to the mobile node and reply messages that are not associated with the predetermined home subnet are discarded. The home subnet for a mobile node may be explicitly assigned or the subnet to which the mobile node was attached during system initialization may be implicitly assigned as the home subnet.

DESCRIPTION OF THE EXAMPLE EMBODIMENTS

Figure 1:
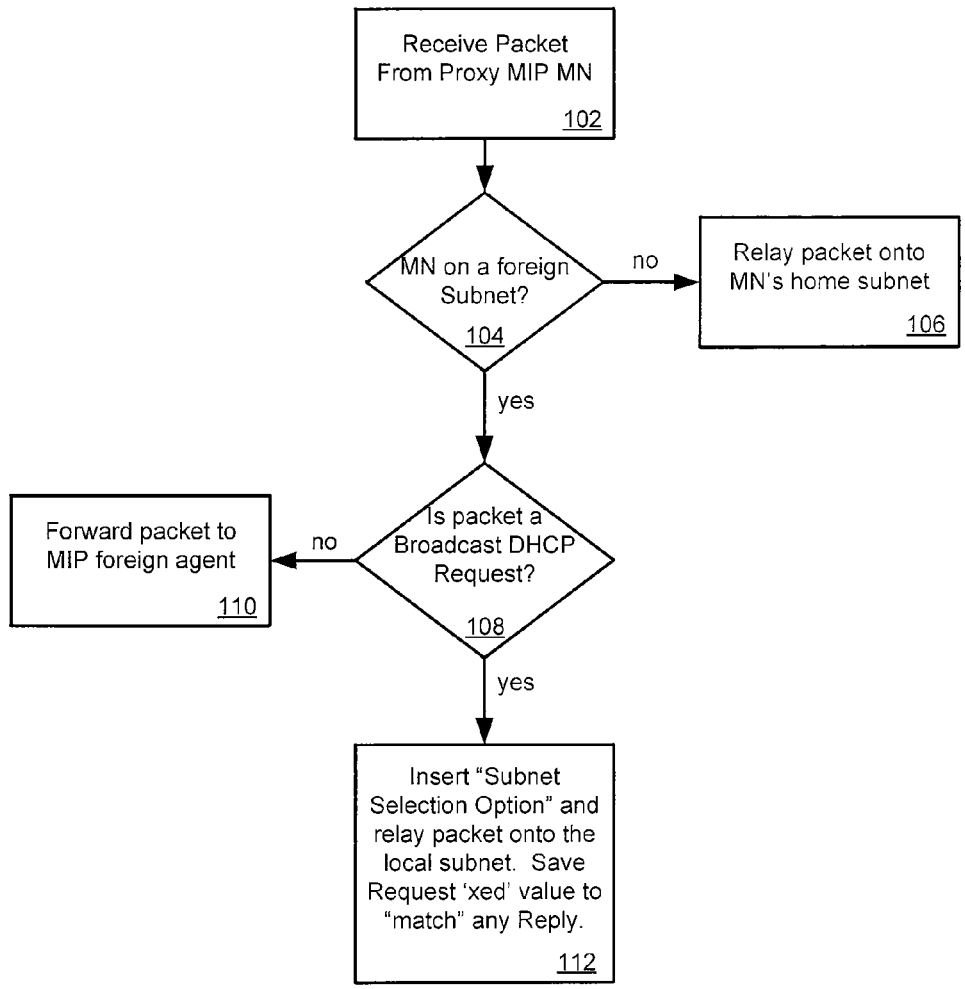
FIG. 1 is a flow chart depicting flow control for a Proxy Mobile IP entity for inserting the "Subnet Selection Option" in DHCP packets received from a "Proxy MIP MN" (a "Proxy Mobile IP mobile node).

The present invention is directed to a method for binding a mobile node to a home subnet. A proxy Mobile IP entity, residing in an access point or a mobile node, uses a DHCP "Subnet Selection Option" to bind the mobile node to a home subnet, where the mobile node uses DHCP. In one aspect of the invention, as will be discussed in detail below, a "guest" mobile node is attached to an access point on a first foreign subnet. The present method is used to bind the guest mobile node to a second secure "guest home subnet." In another aspect of the invention, as will also be discussed in detail below, the present method is used to seamlessly bind a mobile node to a single home subnet as it roams between AP's on multiple subnets. In this aspect, the mobile node uses DHCP to obtain an IP address for the local subnet during system initialization. The local subnet is implicitly the mobile node's home subnet. In either case, standard Mobile IP tunneling is used to relay packets between the mobile node and its assigned home subnet, in a manner that is completely transparent to the mobile node.

In the present invention, the Mobile IP mobile node logic must be implemented with a "Proxy Mobile IP mobile node" (Proxy MIP MN) entity, since Mobile IP is not supported by most commercial TCP/IP protocol stacks (i.e. "Windows"-based). The Proxy MIP MN entity may be contained in the WLAN infrastructure (e.g. within an AP). Alternatively, it can be contained within a Proxy MIP driver "shim" installed on the mobile node. The present method requires the Proxy MIP entity to "snoop" DHCP request messages sent by a mobile node, and to insert the desired Subnet Selection Option into selected DHCP request messages. The Proxy MIP entity must also "snoop" DHCP reply messages sent by a DHCP server, and discard selected DHCP reply messages that do not contain the Subnet Selection Option. The "Subnet Selection Option" employed with the present invention is defined in the IETF standard—RFC 3011, which is hereby incorporated by reference. The option is used to send a request to a DHCP server to allocate an IP address for a specific subnet. It should be appreciated that the invention is not limited to "proxy MIP," but is equally applicable to any other "IP tunneling" protocols such as could be contemplated. It should also be appreciated that the method used to assign a guest mobile node on a foreign subnet to a different home subnet is generally applicable to assign any mobile node to a non-local subnet.

The present invention is sufficiently flexible to retain the IP address of a mobile node through multiple different scenarios. As mentioned above, the invention can be used with a "guest" mobile node, attached to an AP on a first subnet, to bind the "guest" mobile node to a different "guest home subnet." The invention may also be used to keep a Windows 2000/XP mobile node, which uses DHCP, seamlessly bound to a single home subnet as it roams between APs on multiple subnets. With the present solution, the DHCP Subnet Selection Option is used to a keep a mobile node, which uses DHCP to obtain an IP address, bound to a specific "home subnet" which may be different from the mobile node's "local" subnet of attachment.

At startup, a mobile node may be assigned to a home subnet in the following manner. By default, a mobile node may simply be assigned to the local IP subnet at startup. In this instance, no special DHCP processing is required. This solution would not be suitable for "guest" mobile nodes that are not permitted across to the local subnet. The mobile node associates with a parent AP by sending an association message that contains an "SSID" (Service Set Identifier). In the event that the mobile node is not permitted access to the local subnet, a guest "home subnet" can be configured in the parent AP for the mobile node's SSID. Once the mobile node is assigned to a home subnet, it is desirable to keep the mobile node bound to its "current home subnet" as it roams seamlessly between different subnets. When the mobile node roams, an AP-to-AP context transfer protocol can be used to transfer the current home subnet information to a Proxy MIP entity in a new parent AP.

A mobile node without an IP address initially sends a DHCP "DISCOVER" message to solicit a reply from a DHCP server. (The DHCP server may be on the local subnet or a standard "BOOTP Relay Agent" may forward the DISCOVER "request" message to the DHCP server.) The Proxy MIP entity residing in the AP "snoops" or intercepts each DHCP message sent by the respective mobile node. The Proxy MIP entity inserts the DHCP "subnet selection option" into the message, which binds the mobile node to a specific home subnet. The subnet selection option has a "subnet" field. The value of this field may be the home subnet (e.g. the "guest home subnet") configured for the mobile node's SSID. It may alternatively be the current home subnet of the mobile node, if the mobile node was previously assigned to a home subnet. The Proxy MIP entity also adds a "subnet mask" option request in the "parameter request list" option of the DHCP "DISCOVER" Message (if this option is not already indicated in the message). The Proxy MIP entity reads the identification fields of the DHCP message to find the transaction ID ("xed") and client ID ("chaddr") fields. These fields are stored in the internal table of the Proxy MIP entity to compare with as received response message. The 'chaddr' field contains the hardware address of the Mobile Node. The 'xed' field contains a transaction ID that is used to match a DHCP Reply with the corresponding Request.

When a DHCP "DISCOVER" message is sent, one or more DHCP servers may respond with a DHCP "OFFER" message. (A similar processing operation is performed for address renewals, in which a DHCP server sends a DHCP "ACK" Message). The Proxy MIP entity in the AP intercepts these messages and compares the "xed" and "chaddr" fields in the message to the fields it has saved for outgoing requests. If the "chaddr" field does not identify a Mobile Node on a foreign subnet, the Proxy MIP entity forwards the DHCP message to the mobile node without further processing. If the 'chaddr' field identifies a Mobile Node on a foreign subnet and the 'xed' field matches the saved value, the Proxy MIP entity confirms that the DHCP "OFFER" message contains the same "subnet selection option" and "subnet mask option" as in the corresponding request message. If not, the Proxy MIP entity silently discards the OFFER/Reply message. The AP compares the client address ("yiaddr") assigned by DHCP with the "subnet mask" (i.e. the AP performs a binary "AND" operation of these two values). If the client address is not on the subnet requested (as specified in the subnet selection request), the AP drops the message. If the client address is on the requested subnet, the AP removes the subnet selection option and forwards the message to the client.

Similar logic is used to filter DHCP "ACK" messages that are destined for a Mobile Node on a foreign subnet.

Processing as shown above ensures that the IP address assigned to the client is on the requested subnet. The AP caches the "xed" field for a little more than the DHCP recommended value of 60 seconds, after which the client aborts.

A similar mechanism to the above can be employed with a Proxy Mobile IP client to obtain an address on a specific subnet. The client adds the "subnet selection option" and the "subnet mask option" to the DHCP "DISCOVER" message. The value of the subnet to be requested must be configured. For example, a "guest subnet" can be configured for a guest station's SSID. If the DHCP "OFFER" message does not have the subnet selection option and the subnet mask option, the client discards the "OFFER" and "ACK" messages.

As disclosed hereinabove, the present invention enables the subnet selection option to be used to obtain an IP address while visiting a foreign subnet. The invention also provides a Proxy MIP entity in a parent AP or installed as a driver "shim" in a mobile node to "snoop" or intercept a DHCP response message ("OFFER" and "ACK" messages), and to verify that replies to outstanding requests properly indicate the desired subnet selection option and subnet mask option. If the required options are present, the Proxy MIP entity in accordance with the invention verifies that the IP address is indeed on the requested subnet, so as to prevent unauthorized access for "guest" mobile nodes. The Proxy MIP entity of the invention strips off the subnet selection option from the reply and forwards the DHCP reply to the client. The inventive Proxy MIP entity stores the "chaddr" and "xed" field values used in the DHCP requests so as to them against the corresponding values in the replies it receives. These values are only stored for a limited time. As disclosed, the present invention provides an easy method to "assign" a mobile node to a specific subnet to so that a single VLAN does not need to be provisioned across an entire network to accommodate guest users. The present invention also enables a mobile node to be implicitly bound to a home subnet at startup. Thereafter, the invention is used to keep the mobile node seamlessly bound to the home subnet as it roams to different foreign subnets. The present method is easy to implement and is based in existing standards. Consequently, the invention does not require any non-standard changes to existing Mobile IP home and foreign agents.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

Referring to FIG. 1, there is illustrated an example flow chart depicting an example flow control 100 for a Proxy Mobile IP entity for inserting the "Subnet Selection Option" in DHCP packets received from a "Proxy MIP MN" (a "Proxy Mobile IP mobile node"). At 102, a packet is received (or intercepted) from a Proxy MIP MN. At 104, the Proxy Mobile IP entity determines whether the mobile node is on a foreign subnet. If the mobile node is not on a foreign subnet (NO), at 106 the packet is relayed onto the MN's home subnet. If the mobile node is on a foreign subnet (YES), at 108 the Proxy Mobile IP entity determines whether the packet is a broadcast DHCP request, such as a DHCP DISCOVER or DHCP packet. If the packet is not a DHCP request (NO), at 110 the packet is forwarded to the MIP foreign agent. The packet may be sent via reverse tunneling, IP triangular routing, or by any other appropriate means. If, at 108, it is determined that the packet is a broadcast DHCP request (YES), at 112 the Proxy Mobile IP entity inserts the "Subnet Selection Option" into the packet. As described herein supra, a subnet mask may also be inserted into the packet. The packet is relayed onto the local subnet. The Proxy Mobile IP entity saves the transaction identification ('xed' value) in order to match replies to the DHCP broadcast.

Figure 2:
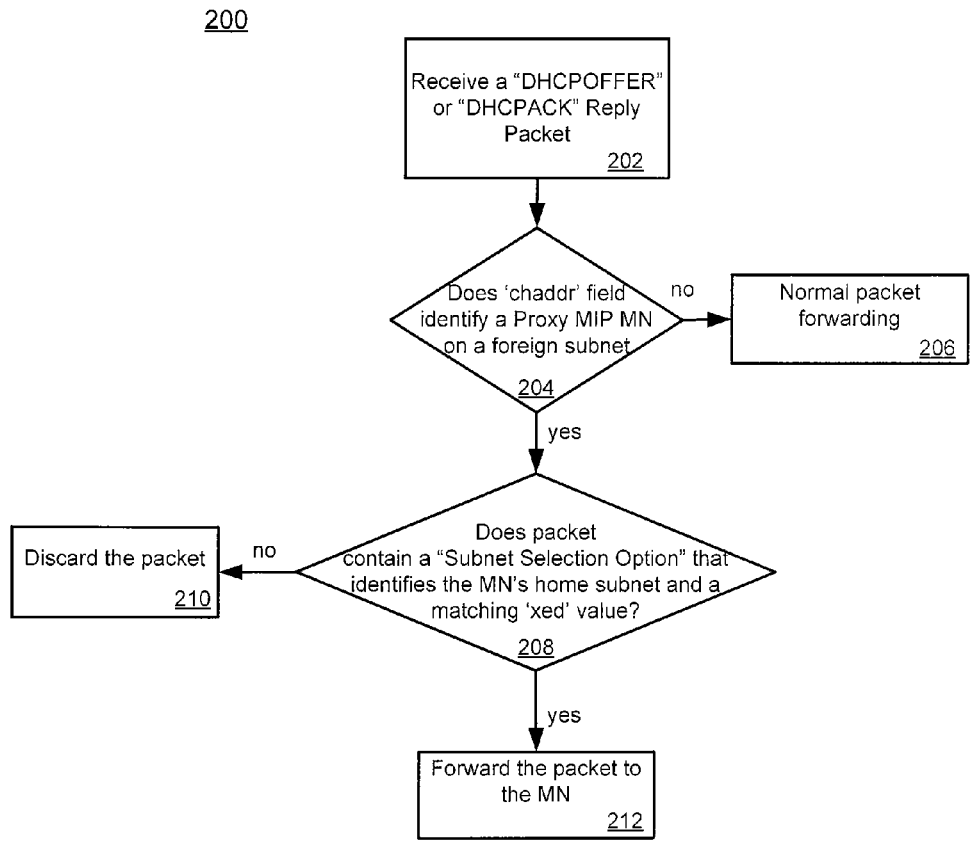
FIG. 2 is flow chart depicting flow control for a Proxy Mobile IP entity for filtering DHCP Reply messages destined to a Proxy MIP MN that do not contain a correct "Subnet Selection Option".

Referring to FIG. 2, there is illustrated an example flow chart depicting flow control 200 for a Proxy Mobile IP entity for filtering DHCP Reply messages destined to a Proxy MIP MN that do not contain a correct "Subnet Selection Option." At 202, the Proxy Mobile IP entity receives (e.g. intercepts) a reply from a DHCP server, for example a DHCPOFFER or DHCPACK. At 204, the Proxy Mobile IP entity determines whether the 'chaddr' field identifies a proxy MIP MN on a foreign subnet. If the 'chaddr' field does not identify a proxy MN on a foreign subnet (NO), at 206 the packet is forwarded normally with no additional processing. If the 'chaddr' field identifies a proxy MIP on a foreign subnet (YES), at 208 the Proxy Mobile IP entity determines if the packet contains a "Subnet Selection Option" that identifies the MN's home subnet and determines whether the 'xed' value matches a stored 'xed' value for the MN. If there is not a "Subnet Selection Option" that identifies the MN's home subnet and a matching 'xed' value (NO), at 210 the packet is discarded. If, at 208, the Proxy Mobile IP entity determines that the packet contains a "Subnet Selection Option" that identifies the MN's home subnet and has a matching 'xed' value (YES), at 212 the packet is forwarded to the MN.

The example embodiments disclosed herein solve many problems associated with previous type systems. However, it will be appreciated that various changes in the details, materials and arrangements of parts, which have been described herein and illustrated in order to explain the nature of the example embodiments, may be made by those skilled in the area within the principle and scope of the appended claims.

The invention claimed is:

1. An apparatus, comprising:
   a proxy mobile Internet Protocol entity;
   wherein the proxy mobile Internet Protocol entity includes a logic processor configured to intercept a Dynamic Host Configuration Protocol (DHCP) request message sent by a mobile node on a first subnet;
   wherein the proxy mobile Internet Protocol entity is configured to insert, via the logic processor, data representative of a second subnet into a subnet selection option of the DHCP request message intercepted on the first subnet to bind the mobile node to the second subnet by requesting an Internet Protocol (IP) address associated with the second subnet;
   wherein the proxy mobile Internet Protocol entity is configured to forward the intercepted DHCP request message with the data representative of a subnet selection option representative of the second subnet to at least one DHCP server;
   wherein the proxy mobile Internet Protocol entity is configured to intercept a multiplicity of DHCP reply messages destined for the mobile node sent from at least one DHCP server;
   wherein the proxy mobile Internet Protocol entity is configured to select a DHCP reply message from the multiplicity of reply messages destined for the mobile node, the selected DHCP reply message having a subnet identifier data in a subnet selection option matching the second subnet;
   wherein the proxy mobile Internet Protocol entity is configured to forward the selected DHCP reply message to the mobile node; and
   wherein the proxy mobile Internet Protocol entity is further configured to discard remaining DHCP reply messages from the multiplicity of reply messages destined for the mobile node.

2. The apparatus of claim 1, wherein the proxy mobile Internet Protocol entity is further operable to remove the subnet selection option from the selected DHCP reply message before forwarding to the mobile node.

3. The apparatus of claim 1, wherein the proxy mobile Internet Protocol entity is further configured to add a subnet mask option request into a parameter request list option of the intercepted message.

4. The apparatus of claim 3, wherein the subnet field indicates the guest home subnet configured for the mobile node's service selection identifier.

5. The apparatus of claim 3, wherein the subnet field indicates the current home subnet of the mobile node previously assigned to a home subnet.

6. The apparatus of claim 3, wherein the proxy mobile Internet Protocol entity is configured to read identification fields of the intercepted DHCP request message to find a transaction identifier and client identifier fields; and
   wherein the proxy mobile Internet Protocol entity is configured to store the transaction identifier and the client identifier in an internal table.

7. The apparatus of claim 6, further comprising:
   wherein the proxy mobile Internet Protocol entity is further configured to compare the transaction identifier and client identifier fields of the reply message with the respective fields stored in the internal table;
   wherein the proxy mobile Internet Protocol entity is further configured to forward the reply message to the mobile node responsive to the transaction identifier and client identifier of the reply message matching the respective fields stored in the internal table and
   wherein the proxy mobile Internet Protocol entity is further configured to discard the reply message responsive to the transaction identifier and client identifier not matching the respective fields stored in the internal table.

8. The apparatus of claim 1, wherein the proxy mobile Internet Protocol entity is configured to assign the mobile node to a local subnet at startup by default.

9. A tangible, non-transitory, media containing logic for execution, and when executed operable to:
   intercept a Dynamic Host Configuration Protocol (DHCP) request message sent by a mobile node on a first subnet;
   insert data representative of a second subnet into a subnet selection option of the DHCP request message intercepted on the first subnet to bind the mobile node to the second subnet by requesting an Internet Protocol (IP) address associated with the second subnet;
   forward the intercepted DHCP request message with the data representative of the second subnet to at least one DHCP server;
   intercept a multiplicity of DHCP reply messages destined for the mobile node sent from at least one DHCP server;
   select a DHCP reply message from the multiplicity of DHCP reply messages destined for the mobile node, the selected DHCP reply message having data representative of a subnet identifier in a subnet selection option field matching the data representative of the second subnet inserted into the subnet selection option of the DHCP request message;

forward the selected DHCP reply message to the mobile node; and discard remaining DHCP reply messages from the multiplicity of DHCP reply messages destined for the mobile node.

10. The method of claim 9, further comprising removing the subnet selection option from the selected DHCP reply message before forwarding to the mobile node.

11. The media of claim 9, the logic further operable to add a subnet mask option request into a parameter request list option of the intercepted message.

12. The media of claim 11, wherein the subnet field indicates the guest home subnet configured for the mobile node's service selection identifier.

13. The media of claim 11, wherein the subnet field indicates the current home subnet of the mobile node previously assigned to a home subnet.

14. The media of claim 11, the logic further operable to read identification fields of the intercepted DHCP request message to find a transaction identifier and client identifier fields; and store the transaction identifier and the client identifier in an internal table for comparison with respective fields in a received response message.

15. The media of claim 14, the logic further operable to:

compare the transaction identifier and client identifier fields of the reply message with the respective fields stored in the internal table;

forward the reply message to the mobile node responsive to the transaction identifier and client identifier of the reply message matching the respective fields stored in the internal table and discard the reply message responsive to the transaction identifier and client identifier not matching.

16. The media of claim 9, the logic further operable to assign the mobile node to a local subnet at startup by default.

* * * * *